Patented Nov. 23, 1926.

1,608,056

UNITED STATES PATENT OFFICE.

ELROY A. CHASE, OF NORTHFIELD, VERMONT.

ABRASIVE COMPOSITION FOR USE IN SAND-BLAST WORK.

No Drawing.  Application filed March 20, 1925. Serial No. 17,116.

This invention relates particularly to the cutting of granite or other similar material by a sand blast applied thereto. In the cutting of such materials and especially light colored granite, it is difficult to bring out a satisfactory contrast between the natural stone and the finished surface, particularly when sinking a design therein.

It is the object of my invention to provide a new abrasive compound for such purposes by the use of which new and improved results may be attained. The detailed features of my invention and the advantages thereof will be hereinafter described and more particularly pointed out in the appended claims.

My improved abrasive compound comprises a mixture of cutting sand either natural or artificial with a certain proportion of a different and finer abrasive material.

In the preferred form of my composition I make use of a fine sea sand in which the grains of sand are small and rounded rather than crystalline, and I mix with the sand a certain proportion of carborundum or other form of silicon carbide. Both the proportion and the grade of the silicon carbide may be varied within rather wide limits, but very satisfactory results are obtained by using from two to three parts of sand to one part of silicon carbide and by using carbide of grade #70 or grade #80.

When such an abrasive mixture is used in cutting granite by means of a sand blast, I have found that the surface produced is distinctly and permanently darker in apparent color than the surface produced by the use of sand alone. This darker color is not the result of any discoloration or stain due to the carborundum or carbide but is caused by the abrasive action of the carborundum upon the stone, in addition to the usual action of the sand. The surfaces are more smoothly finished and appear to have a considerable degree of polish which is not found where sand alone is used as an abrasive.

While my improved abrasive compound is particularly well adapted for sinking stenciled designs into a granite surface, it is also well adapted for finishing flat surfaces of stone and when thus used, the finished stone is very substantially darker in appearance than when sand alone is used.

While I have used carborundum or silicon carbide as convenient terms for designating the abrasive added to the sand, it will be understood that other abrasives having similar characteristics may be substituted within the scope of my invention as set forth in the claims, and I do not wish to be otherwise limited to the details herein disclosed, but what I claim is:—

1. A granular composition suitable for use with an air blast, comprising a major portion of sand and a smaller portion of fine grains of silicon carbide.

2. A granular composition suitable for use with an air blast, comprising sand having fine rounded grains and not more than an equal quantity of fine grains of silicon carbide.

3. A granular composition suitable for use in an air blast and capable of producing the effect of contrasting colors in granite or like stone, comprising a mixture of sand and fine grains of silicon carbide.

In testimony whereof I have hereunto affixed my signature.

ELROY A. CHASE.